(12) United States Patent
Newman

(10) Patent No.: US 9,546,640 B2
(45) Date of Patent: Jan. 17, 2017

(54) PRESSURIZED SOLAR POWER SYSTEM WITH SEALED BUBBLE PRESSURIZER AND CONTROL SYSTEM

(71) Applicant: US MICROPOWER LLC, Jacksonville, FL (US)

(72) Inventor: Michael Newman, Jacksonville, FL (US)

(73) Assignee: U S MICROPOWER INC, Jacksonville, FL (US)

( * ) Notice: Subject to any disclaimer, the term of this patent is extended or adjusted under 35 U.S.C. 154(b) by 551 days.

(21) Appl. No.: 13/953,075

(22) Filed: Jul. 29, 2013

(65) Prior Publication Data

US 2013/0312411 A1    Nov. 28, 2013

Related U.S. Application Data

(60) Continuation-in-part of application No. 13/294,480, filed on Nov. 11, 2011, now abandoned, which is a division of application No. 12/870,202, filed on Aug. 27, 2010.

(60) Provisional application No. 61/237,769, filed on Aug. 28, 2009.

(51) Int. Cl.
| | |
|---|---|
| F03G 6/00 | (2006.01) |
| F03G 7/04 | (2006.01) |
| F03B 17/00 | (2006.01) |
| F24J 2/07 | (2006.01) |

(52) U.S. Cl.
CPC .............. *F03B 17/00* (2013.01); *F03G 6/005* (2013.01); *F03G 7/04* (2013.01); *F24J 2/07* (2013.01); *Y02E 10/41* (2013.01); *Y02E 10/46* (2013.01)

(58) Field of Classification Search
CPC ............ F03G 6/005; F03G 6/067; F03G 7/04; F24J 2/34; F24J 2/345; Y02E 10/00–10/18; Y02E 10/40–10/47; F01K 23/00
USPC .................... 60/641.8–641.15, 659
See application file for complete search history.

(56) References Cited

U.S. PATENT DOCUMENTS

| | | | | |
|---|---|---|---|---|
| 4,055,948 A | * | 11/1977 | Kraus ..................... | F03G 6/067 126/573 |
| 4,079,591 A | | 3/1978 | Derby et al. | |
| 4,099,381 A | * | 7/1978 | Rappoport .............. | F03G 6/067 126/616 |
| 4,164,123 A | | 8/1979 | Smith | |
| 4,213,563 A | | 7/1980 | van Kuijk | |
| 4,449,515 A | * | 5/1984 | Nilsson, Sr. ............ | F03G 6/067 126/618 |
| 4,455,826 A | * | 6/1984 | Knoos ..................... | F02G 1/00 60/517 |

(Continued)

*Primary Examiner* — Thomas Denion
*Assistant Examiner* — Laert Dounis
(74) *Attorney, Agent, or Firm* — Smith Gambrell & Russell LLP

(57) ABSTRACT

Systems and methods for generating electrical power using a solar power system comprising pressurized pipes for transporting liquid water. The pressurized pipes flow through solar collectors which concentrate sunlight on the water flowing through the pipes. The pressurization in the pipes allows the water flowing through the pipes to absorb large quantities of energy. The pressurized and heated water is then pumped to a heat exchanger coil where the thermal energy is released to produce steam for powering a steam turbine electrical generator. Thereafter, the water is returned to the solar collectors in a closed loop to repeat the process.

4 Claims, 11 Drawing Sheets

(56) References Cited

U.S. PATENT DOCUMENTS

| | | | |
|---|---|---|---|
| 4,888,954 A * | 12/1989 | Silvestri, Jr. | F01K 7/165 60/652 |
| 5,685,151 A | 11/1997 | Ross | |
| 6,233,914 B1 | 5/2001 | Fisher | |
| 6,571,548 B1 * | 6/2003 | Bronicki | F01K 23/10 60/39.181 |
| 7,003,955 B2 | 2/2006 | Davis | |
| 7,051,529 B2 * | 5/2006 | Murphy | F24J 2/07 60/641.11 |
| 7,185,493 B1 | 3/2007 | Connelly | |
| 7,296,410 B2 | 11/2007 | Litwin | |
| 7,340,899 B1 * | 3/2008 | Rubak | F03G 6/003 60/641.2 |
| 7,845,172 B2 | 12/2010 | Goldman | |
| 8,169,101 B2 | 5/2012 | Hinders et al. | |
| 8,276,381 B2 | 10/2012 | Weres | |
| 8,281,590 B2 | 10/2012 | Hinders et al. | |
| 2002/0153004 A1 | 10/2002 | Agata | |
| 2009/0101138 A1 | 4/2009 | Eck et al. | |
| 2009/0158736 A1 | 6/2009 | Mierisch | |
| 2009/0199557 A1 | 8/2009 | Bennett | |
| 2009/0211249 A1 * | 8/2009 | Wohrer | F01K 3/00 60/641.8 |
| 2010/0043433 A1 | 2/2010 | Kelly | |
| 2011/0041505 A1 * | 2/2011 | Kasuya | F01K 23/065 60/660 |
| 2011/0048408 A1 * | 3/2011 | Newman | F03B 17/00 126/646 |
| 2011/0126539 A1 * | 6/2011 | Ramaswamy | F01K 25/08 60/641.2 |
| 2011/0277469 A1 * | 11/2011 | Brenmiller | F03G 6/067 60/641.8 |
| 2011/0277470 A1 | 11/2011 | Benyaminy et al. | |
| 2012/0124998 A1 | 5/2012 | Newman | |
| 2012/0137683 A1 * | 6/2012 | Jurgen | F01D 19/00 60/641.8 |
| 2014/0196455 A1 * | 7/2014 | Kuo | F03G 6/005 60/641.8 |

* cited by examiner

PRESSURIZED SOLAR POWER SYSTEM WITH SEALED BUBBLE PRESSURIZER AND CONTROL SYSTEM

CROSS-REFERENCE TO RELATED APPLICATIONS

This application is a continuation-in-part application of U.S. patent application Ser. No. 13/294,480, filed Nov. 11, 2011, which is a divisional application of U.S. patent application Ser. No. 12/870,202, filed Aug. 27, 2010 (abandoned), which claims priority to U.S. provisional application Ser. No. 61/237,769, filed Aug. 28, 2009, which is incorporated herein by reference.

BACKGROUND OF THE INVENTION

Large scale solar power plants utilizing concentrating solar power ("CSP") technology have been producing power for over thirty years. The Solar Electric Generating Systems ("SEGS") facilities in the Mojave Desert of California are a well-known example of solar power plants using such CSP technology. Other types of solar thermal power plants are in operation in various other areas of the World. CSP utilizes solar collectors comprising large mirrors, mirror arrays, or lenses, which concentrate solar energy upon a typically unpressurized pipe or tube that contains a heat transfer fluid. Synthetic or organic oils having a high boiling point or salts are used as the heat transfer fluid in a variety of power plant configurations. As an example, some of the SEGS facilities utilize Therminol® from Solutia, Inc. as the heat transfer fluid.

As the heat transfer fluid flows through the unpressurized pipe inside the solar collectors, the transfer fluid is heated by the incident sunlight. One or more pumps are situated along the pipe to pump the fluid through the solar collectors and towards a boiler with a heat exchanger coil. At the heat exchanger coil, the transfer fluid is used to heat water in the boiler to produce steam. The steam is then used for powering a steam driven engine that turns a generator to produce electricity. After the heat transfer fluid releases its thermal energy in the boiler, the heat transfer fluid is pumped back to the solar collectors to be heated again and the closed cycle continues.

A disadvantage of the use of oils as heat transfer fluids is that the fluid has a relatively low energy density. For example, Therminol® has an energy density of approximately 2100 joules per kilogram degree Celsius (J/kg° C.) whereas ordinary water has an energy density of approximately 4200 J/kg° C. This relatively low energy density for Therminol® means that it carries less thermal energy from the solar collectors to the heat exchanger coil than water thus resulting in a larger and more costly required set of heat transfer components.

Another disadvantage of synthetic heat transfer fluids is that they are often flammable. A fire at one of the SEGS plants could cause massive damage and could result in personally injury or death to power plant workers. As a result, care must be taken in handling the fluids to keep the fluids from overheating.

For these and other reasons, a number of solar power systems have been developed to produce steam directly from water rather than using a synthetic heat transfer fluid. Such systems—dubbed Direct Solar Steam generation ("MS") or Direct Steam Generation ("DSC")—distribute water through the unpressurized pipes in the solar collectors rather than distributing a synthetic heat transfer fluid. Because water has a much lower boiling point than a synthetic heat transfer fluid, the water will eventually turn to steam after being heated a sufficient amount. Thereafter, the steam is directed to a steam turbine for generating electricity.

Such DSG systems have their own drawbacks. The presence of steam in the pipes of the solar receivers reduces the efficiency of the collectors and receivers because steam has a significantly lower capacity to absorb heat than liquid water. Thus, the steam can carry less thermal energy towards the turbine than can pressurized water. Further, the use of a two-phase (water/steam) flow within the pipes of long linear solar receivers creates a condition known as the Ledinegg Instability. This phenomenon results in a boiling front as the water moves through the pipes and flashes over to steam. To compensate for this instability, an undesirable pressure drop must be introduced into the system. Finally, DSG systems are more sensitive to variations in solar flux density and changes in atmospheric conditions because the systems will not function properly unless the water in the solar collectors is sufficiently heated to flash over to steam at a required rate. Taken together, these drawbacks necessitate the use of larger, more expensive solar collectors to produce a required amount of steam to produce electricity. Therefore, such DSG systems may have little or no cost savings in comparison to traditional CSP systems containing synthetic heat transfer fluid.

SUMMARY OF THE INVENTION

The present invention is a pressurized solar power system for generating steam from solar energy for the production of electric energy. Particularly, the systems and methods of the present invention for generating electric power use solar energy collectors to heat liquid water circulating in a pressurized closed solar loop of pipes. Circulation of the liquid water in the pressurized closed solar loop transfers heat from the solar collectors to a boiler to generate steam, which steam in turn drives a steam engine mechanically coupled to an electricity generator. The solar collectors concentrate sunlight on the water flowing in the solar receiver of the pressurized closed solar loop such that the water is exposed to temperatures well above the atmospheric temperature of the boiling point of water. Because the water inside the pipes of the closed solar loop at the solar receiver, the focal point of the solar collectors, is pressurized, the water flowing through the pipes of the closed solar loop can be heated well above the ordinary boiling point of water (100° C.). Advantageously, the systems and methods described herein rely upon the superior heat transfer capabilities of liquid water in comparison to synthetic or organic heat transfer fluids, salts or steam. Furthermore, the lack of organic or synthetic heat transfer fluid minimizes costs and mitigates the hazardous nature and safety concerns associated with the use of such fluids.

Because the pressurization of the pipes in the closed solar loop described herein prevents the water flowing therethrough from flashing over to steam when heated to a high temperature, the instabilities and unwanted pressure drops associated with two-phase (water/steam) flow are eliminated. Further, the use of water, rather than water/steam or synthetic oils or other heat transfer fluids used for transporting thermal energy, takes advantage of water's superior heat energy carrying capacity in comparison to steam or the oils and synthetic fluids.

Important to successful operation of the present invention is a control system that measures the variable parameters of the system in order to efficiently use solar energy to create steam. Due to the variable nature of the primary energy input source, namely sunlight, a highly specialized power plant control system is required. Such control system must adapt to daily variations of sunlight available for concentration created by the diurnal shift of the sun's position over the course of a year, the daily ambient temperature changes of the location where a solar power plant may be located, weather patterns that create varying cloud conditions, atmospheric clarity due to wind drive particulates, and surface winds that create movement of solar reflectors used in concentration a highly variable input energy source. Further, there are requirements for management of a variable load of a power generation system that is connected to a public or private utility grid. Therefore, key to the successful operation of the pressurized solar power system of the present invention is a power plant control system. Conventional fueled or nuclear power plants all have a constant energy input cycle and therefore do not require the level of input energy measurement and fuel resource management of that required to successfully operate a pressurized solar power system of the present invention.

DETAILED DESCRIPTION

Figure 1:
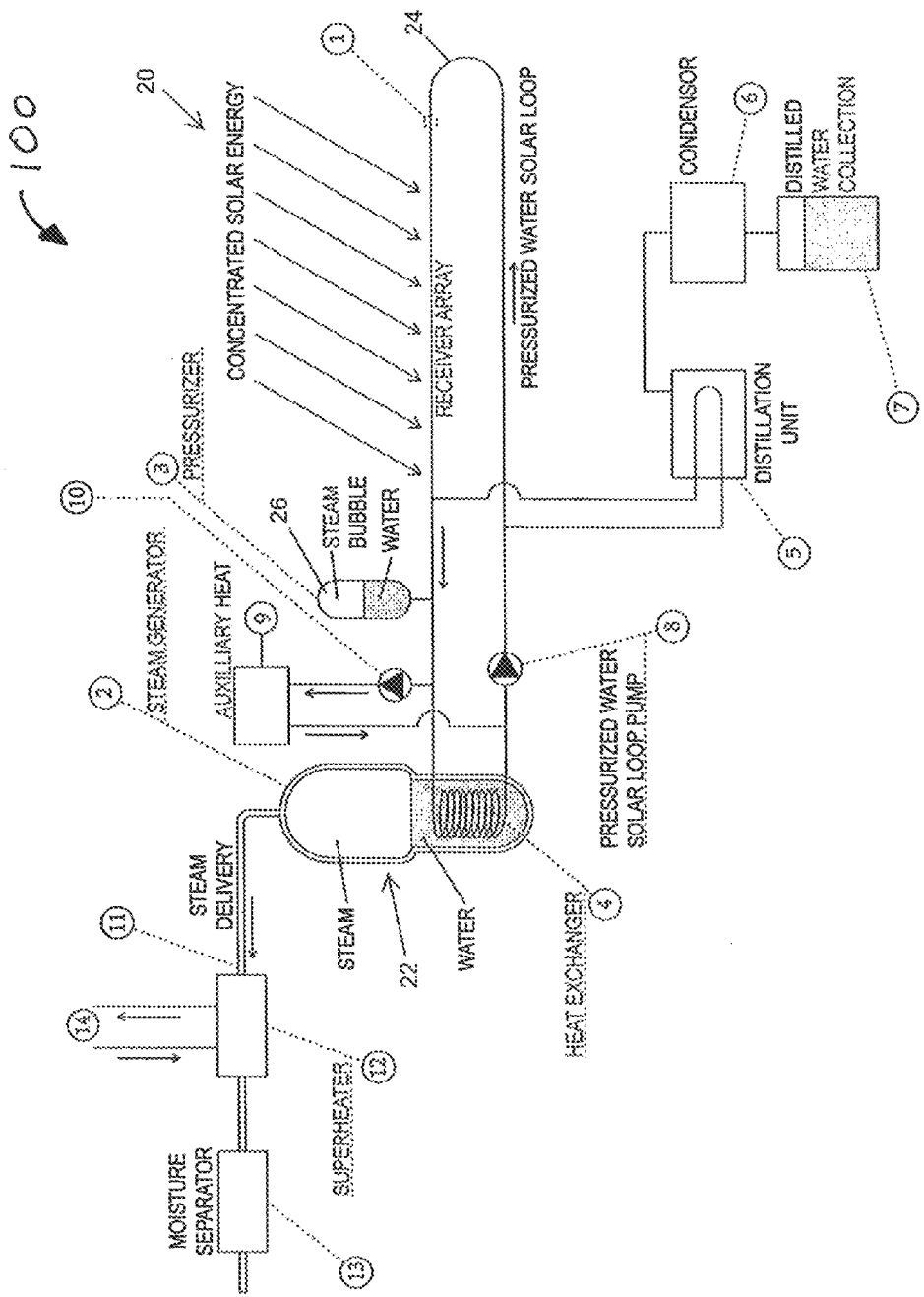
FIG. 1 is a schematic view of a first embodiment of a pressurized solar power system in accordance with the present invention.

FIGS. 1-6 show various embodiments and aspects of pressurized solar power systems in accordance with the present invention, with like reference numerals indicating like parts throughout the several views.

FIG. 1 shows a detailed view of a first embodiment of a pressurized solar power system 100 in accordance with the present invention. The solar power system 100 includes a pressurized closed solar loop 1 comprising an enclosed hollow pipe or tube with a solar collector array 20 located at one end (solar receiver) 24 and a heat exchanger coil 4 at the opposite end of the pressurized closed solar loop 1. The solar collector array 20 concentrates solar energy on the solar receiver 24 of the pipe of the closed solar loop 1. The solar collector array 20 may comprise any suitable means of concentrating solar energy on the solar receiver 24 of the pressurized closed solar loop 1 including, but not limited to, parabolic troughs, parabolic dishes, compact linear Fresnel reflectors, linear Fresnel reflectors, compound parabolic collectors, two axis tracking systems that focus solar energy on a tower or other structure, and any other solar energy concentration system.

The pressurized closed solar loop 1 forms a closed loop and preferably contains water within the closed solar loop 1. A pressurizer 3 is attached to the pressurized closed solar loop 1 to pressurize the closed solar loop 1 above normal atmospheric pressure. The pressurizer 3 is a steam bubble pressurizer comprising a large internal chamber where steam can form in the upper section of the chamber but cannot be released. As the water in the closed solar loop 1 is heated due to the concentrated sunlight directed towards the solar receiver 24 of the closed solar loop 1, a steam bubble forms in the upper portion of steam bubble pressurizer 3. The steam bubble can also be formed by pre-heating the water in the closed solar loop 1. After forming, the steam bubble in the upper section of the pressurizer 3, the pressurizer 3 keeps pressure on the water in the pressurized closed solar loop 1. Advantageously, this pressure increases the boiling point of the water in the pressurized closed solar loop 1, thus preventing the water from flashing over to steam. As solar energy increases the temperature of water circulating in closed solar loop 1, the steam bubble in the pressurizer 3 increases in pressure thereby creating a self-regulating pressure control system for the pressurized closed solar loop 1.

As described above, the use of a single-phase (water only) pressurized closed solar loop 1 prevents Ledinegg Instability and unwanted pressure drop. Water also has an increased energy carrying capacity in comparison to steam. Thus, the pressurized water in the pressurized closed solar loop 1 can carry more energy than a comparable DSG system with a two-phase (water/steam) energy transport mechanism.

One or more pumps 8 are located along the pressurized closed solar loop 1. These pumps 8 act to circulate water through the solar receiver 24 adjacent the solar collector array 20 and through the heat exchanger coil 4. Control mechanisms control the pumps 8 and therefore the flow rate of water flowing through pressurized closed solar loop 1.

An auxiliary heat injection unit 9 can be attached to pressurized closed solar loop 1, preferably near the point where the pressurized closed solar loop 1 enters the heat exchanger coil 4. One or more pumps 10 pump water from the closed solar loop 1 into the auxiliary heat injection unit 9. The auxiliary heat injection unit 9 can be used to heat the water in the closed solar loop 1 if there is insufficient solar energy to heat the water to an appropriate operating temperature such as on cloudy days or during the nighttime hours.

In some embodiments, an optional distillation unit 5, condenser 6, and water collector 7 can be connected to the pressurized closed solar loop 1. The distillation unit 5 can use the hot water from the pressurized closed solar loop 1 to boil water to create steam. This steam can then be transferred to the condenser 6 where the steam will be cooled and condensed into clean distilled water. Such distilled water can be collected in water collector 7. The distilled water can later be used for any number of purposes including, but not limited to, providing makeup water for the heat exchanger coil 4 or the pressurized closed solar loop 1.

After the water is heated in the solar receiver 24 of the pressurized closed solar loop 1 that is adjacent the solar collector array 20, the water in the pressurized closed solar loop 1 travels to the heat exchanger coil 4. The heat exchanger coil 4 is located inside a pressurized steam generator 2 with liquid water in the lower portion of the steam generator 2. Together, the steam generator 2 and the heat exchanger coil 4 comprise a heat exchanger 22. The heat exchanger coil 4 of the pressurized closed solar loop 1 is positioned in the water in the lower portion of the steam generator 2. The heat exchanger coil 4 of the pressurized closed solar loop 1 is configured in a coil, loop, or other configuration so as to expose a substantial surface area of the pipe of the pressurized closed solar loop 1 to the water contained in the lower portion of the steam generator 2. The hot water contained in closed solar loop 1 will transfer its heat to the water in the bottom of steam generator 2 thus causing the water in the steam generator 2 to boil and produce steam. The steam generator 2 of heat exchanger 22 has suitable ports or openings for releasing steam and for introducing makeup water into the steam generator 2. The makeup water is cooler than the water present in the pressurized closed solar loop 1 so as to facilitate the transfer of thermal energy inside the steam generator 2. As described in more detail below, cooling towers or other means for cooling water can be used to sufficiently cool water for use as makeup water.

After the hot water in the pressurized closed solar loop 1 transfers its thermal energy to create steam inside the steam generator 2, the cooled water exits the heat exchanger coil 4 and returns to the solar receiver 24 adjacent the solar collector array 20. In such a manner, the water inside pressurized closed solar loop 1 continuously circulates through closed solar loop 1, absorbing thermal energy from the sunlight at the solar collector array 20 and releasing thermal energy to the water inside the steam generator 2 by means of the heat exchanger coil 4.

Figure 2:
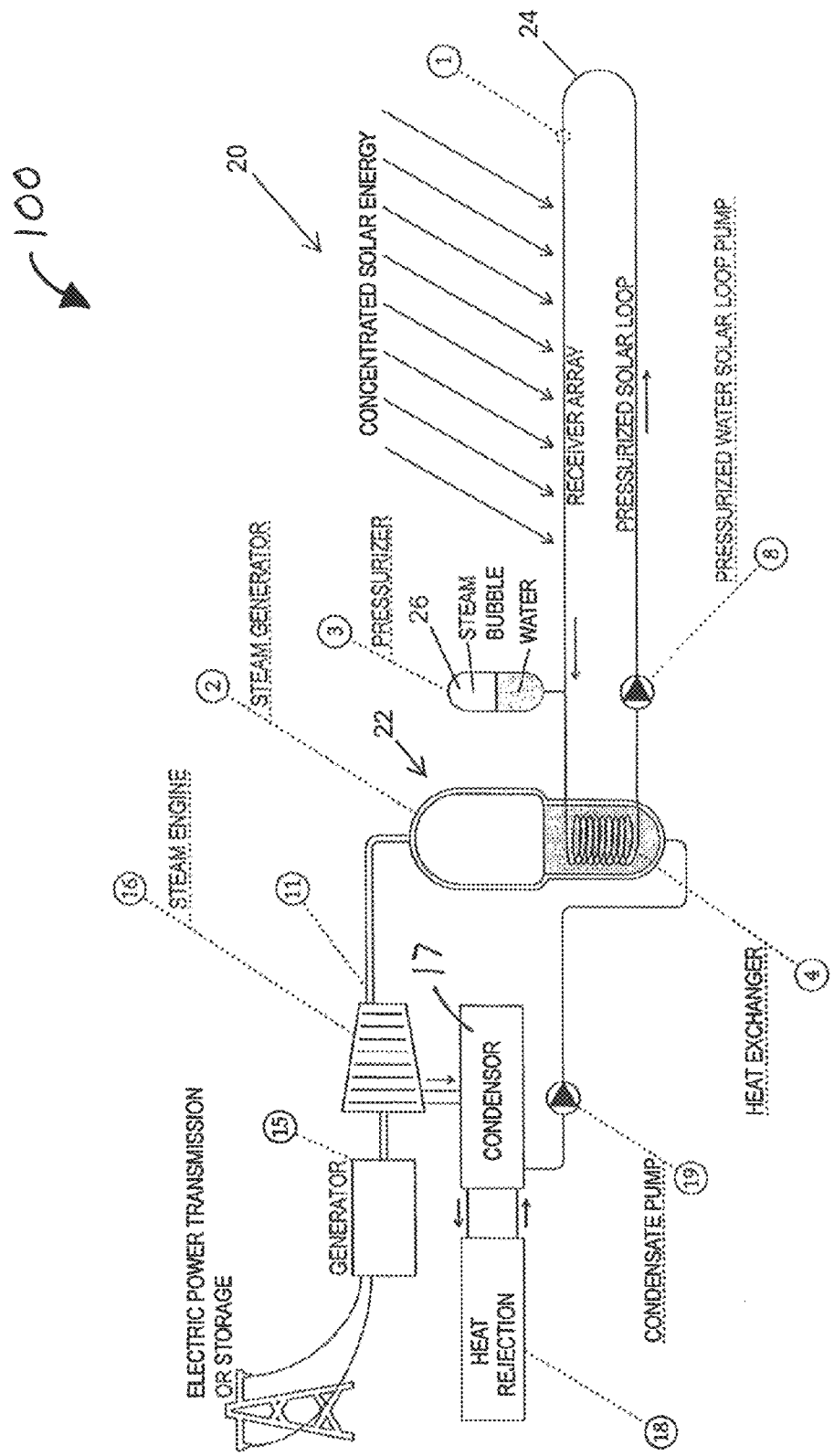
FIG. 2 is a schematic view of the embodiment of FIG. 1 including the steam turbine and power generation portion of the pressurized solar power system in accordance with the present invention.

With reference to FIGS. 1 and 2, the steam produced inside the steam generator 2 by the heat exchanger coil 4 exits the steam generator 2 and proceeds through steam piping 11 towards a steam turbine 16. As known to those skilled in the art, the steam turbine 16 utilizes the energy contained in the steam to generate rotary motion. This motion, in turn, is drives a generator 15 to produce electricity.

As shown in FIG. 1, an optional superheater 12 may be attached to steam piping 11 prior to entry into steam turbine 16. The superheater 12 can be used to add additional heat energy to the steam from any external heat source 14 including, but not limited to, additional solar heating sources. An optional moisture separator 13 can also be attached to steam piping 11.

Returning to FIG. 2, after powering the steam turbine 16, the steam will exit the turbine 16 and enter a condenser 17 where the steam will be condensed back into water. The water then is transferred to a heat rejection device 18 such as a cooling tower. The cooled water will then flow back into the steam generator 2. One or more pumps 19 may act to pump the water back to the steam generator 2. In such a manner, the water is ready to again be heated by the heat exchanger coil 4 of the pressurized closed solar loop 1 to form steam inside the steam generator 2.

As described above, the pressurized water in pressurized closed solar loop 1 allows the water to absorb substantial heat energy and rise to a temperature well above 100° C. without flashing over to steam. Advantageously, this process allows the pressurized solar power system 100 to carry more energy than a two-phase (water/steam) DSG system or a system using a synthetic heat transfer fluid in a non-pressurized closed solar loop. The enhanced efficiency of the pressurized solar power system 100 described herein also allows for the use of smaller and/or fewer solar collectors in the collector receiver array 20 than in prior art systems. The efficiency of the pressurized solar power system 100 can be further increased by placing the steam turbine 16 and the heat exchanger coil 4 in the center of the solar collector array 20, thus reducing the length of piping between the solar receiver 24 and the heat exchanger coil 4 as well as the length of piping 11 between the steam generator 2 and the steam turbine 16.

Figure 3:
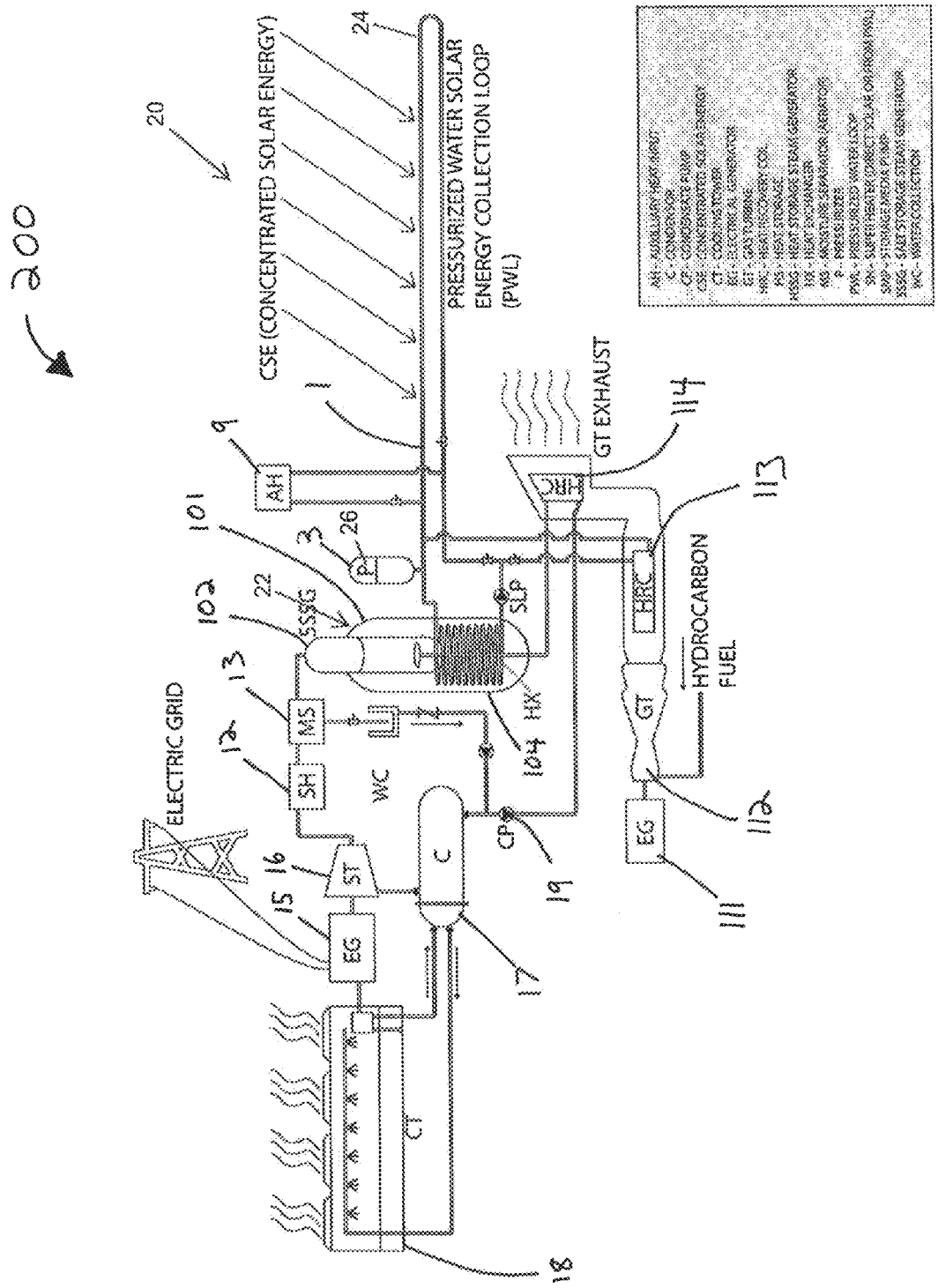
FIG. 3 is a schematic view of a second embodiment of a pressurized solar power system in accordance with the present invention.

Turning to FIG. 3, a second embodiment of a pressurized solar power system 200 is shown. The embodiment shown in FIG. 3 is similar in many respects to the embodiment shown in FIGS. 1-2, with like reference numerals indicating like parts between the two embodiments. The solar power system 200 includes a pressurized closed solar loop 1 comprising an enclosed hollow pipe or tube with a solar collector array 20 located adjacent a solar receiver 24 and a heat exchanger coil 104 at the opposite end of the pressurized closed solar loop 1. The solar collector array 20 concentrates solar energy on the solar receiver 24 of the closed solar loop 1. As previously described, the solar receiver 24 of the pressurized closed solar loop 1 absorbs thermal energy from the solar collector array 20, and the closed solar loop 1 transports the absorbed thermal energy to the heat exchanger coil 104.

A heat exchanger 22 comprises the heat exchanger coil 104, a pressurized steam generator 102, and a non-pressurized storage media vessel 101. The storage media vessel 101 contains a substance suitable for storing and transporting thermal energy such as molten salt. The steam generator 102 contains water in the lower portion of the vessel which, when heated sufficiently by the heat exchanger coil 104, will boil and produce steam in the upper portion of steam generator 102.

A portion of the heat exchanger coil 104 of the pressurized closed solar loop 1 is located in the storage media vessel 101 near the lower end of the storage media vessel 101. The heat exchanger coil 104 is in the shape of a coil, loop, or other shape to expose a substantial surface of the heat exchanger coil 104 to the surrounding salt inside the storage media vessel 101. The hot water in the heat exchanger coil 104 of the pressurized closed solar loop 1 advantageously heats the molten salt contained in the storage media vessel 101. In turn, the molten salt is in contact with the exterior portion of steam generator 102 and transfers heat energy from the molten salt to the steam generator 102. This transfer of heat energy from the molten salt to the steam generator 102 causes the water inside steam generator 102 to heat up and eventually to turn to steam. As described above with respect to FIGS. 1 and 2, the steam can be used to drive a steam turbine 16 and produce electric energy at an electricity generator 15.

Figure 4:
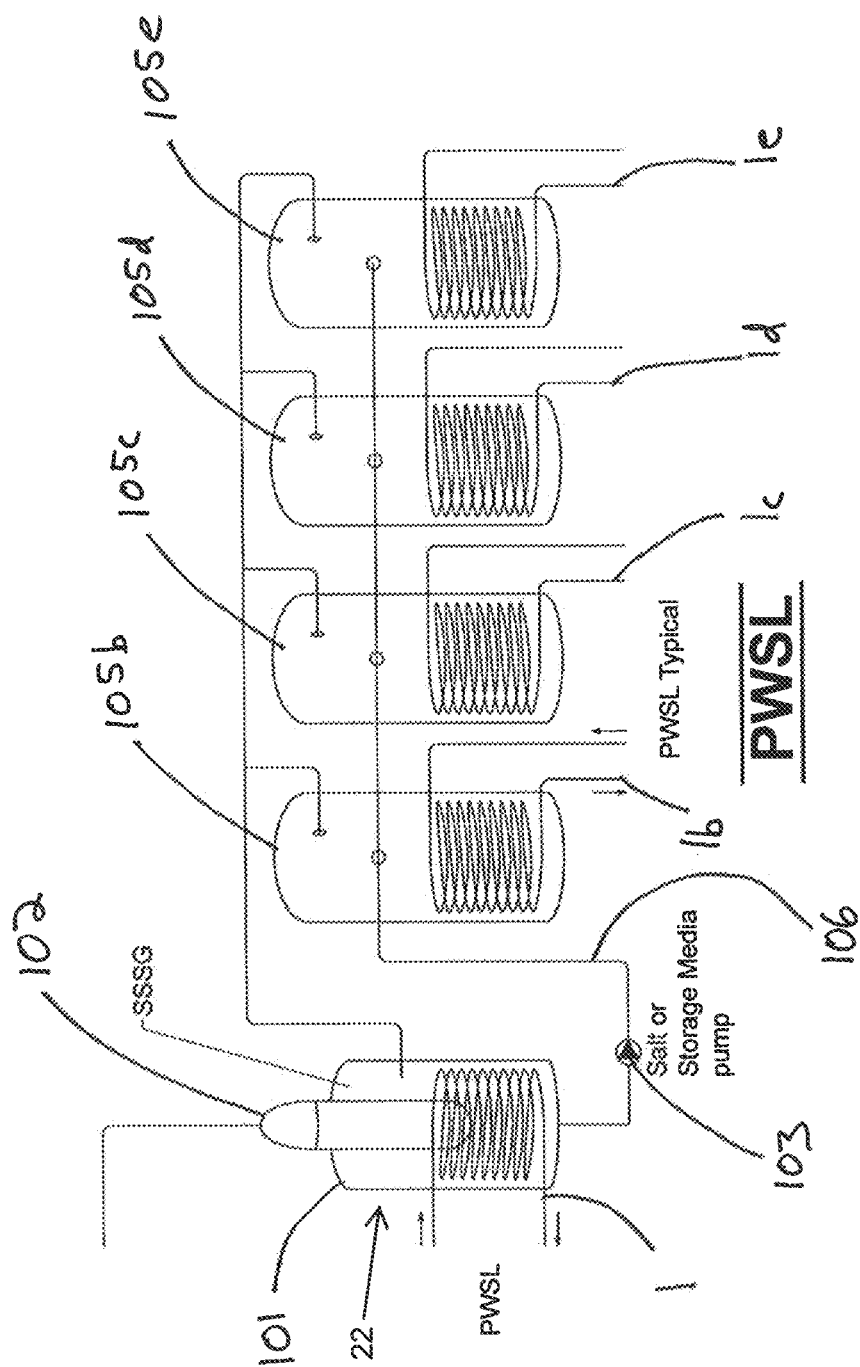
FIG. 4 is a schematic view of the heat exchanger coil of FIG. 3 and a plurality of thermal storage tanks for use with the second embodiment in accordance with the present invention.

Turning to FIG. 4, a plurality of thermal storage tanks 105b-105e are shown. One or more of such thermal storage tanks 105b-105e may optionally be used in conjunction with the pressurized solar power system 200 of FIG. 3. Advantageously, the thermal storage tanks 105*b*-105*e* can be used to store heat energy during the day for use during the night or on cloudy days.

The thermal storage tanks 105*b*-105*e* contain molten salt or any other substance suitable for storing heat including, but not limited to, eutectic salts, brines, and graphite. Each storage tank 105*b*-105*e* also has disposed therein a portion of a pressurized closed solar loop 1*b*-1*e*. Just as the heat exchanger coil 104 of the pressurized closed solar loop 1 heats the molten salt in the storage media vessel 101 in FIG. 3, the pressurized closed solar loops 1*b*-1*e* are utilized to absorb solar energy as thermal energy, transport that thermal energy to the storage tanks 105*b*-105*e*, and heat the molten salt contained in the storage tanks 105*b*-105*e*. That is, each of the pressurized closed loops 1*b*-1*e* are connected at one end of the pressurized closed solar loop 1 to one or more solar receivers 24 and are connected at the other end of the pressurized closed loop 1 to the storage tanks 105*b*-105*e*. In such a manner, solar energy can be absorbed during a sunny day, converted to thermal energy, and stored in a storage tank 105*b*-105*e* for use during the night or on cloudy days.

As shown in FIG. 4, a storage media loop 103 travels from the storage media vessel 101 of heat exchanger 22 to the storage tanks 105*b*-105*e*. The storage media loop 103 continues from the storage tanks 105*b*-105*e* back to the storage media vessel 101. One or more pumps 106 are located along the storage media loop 103 to pump the molten salt. On cloudy days or during the night, hot molten salt from the storage tanks 105*b*-105*e* can be pumped into the storage media vessel 101 of heat exchanger 22 to produce steam in steam generator 102. As such, the pressurized solar power system 200 can continue to produce electricity even when there is little or no sunlight.

Returning to FIG. 3, an optional co-generation or combined cycle power generation aspect of the present invention is shown. Specifically, the pressurized solar power systems 100, 200 described herein may be used in conjunction with conventional power generation systems (such as natural gas or coal fired power generation plants) to supplement the power produced by the pressurized solar power system 100, 200. As shown in FIG. 3, hydrocarbon fuel such as natural gas can be used with a conventional gas turbine 112 to power an electric generator 111. One or more heat energy recovery coils 113 can advantageously be used to recover waste heat energy from the gas turbine 112 to heat water in the pressurized closed solar loop 1. Similarly, one or more heat recovery coils 114 may be used to pre-heat the water before the water enters the steam generator 102 of heat exchanger 22.

Figure 5:
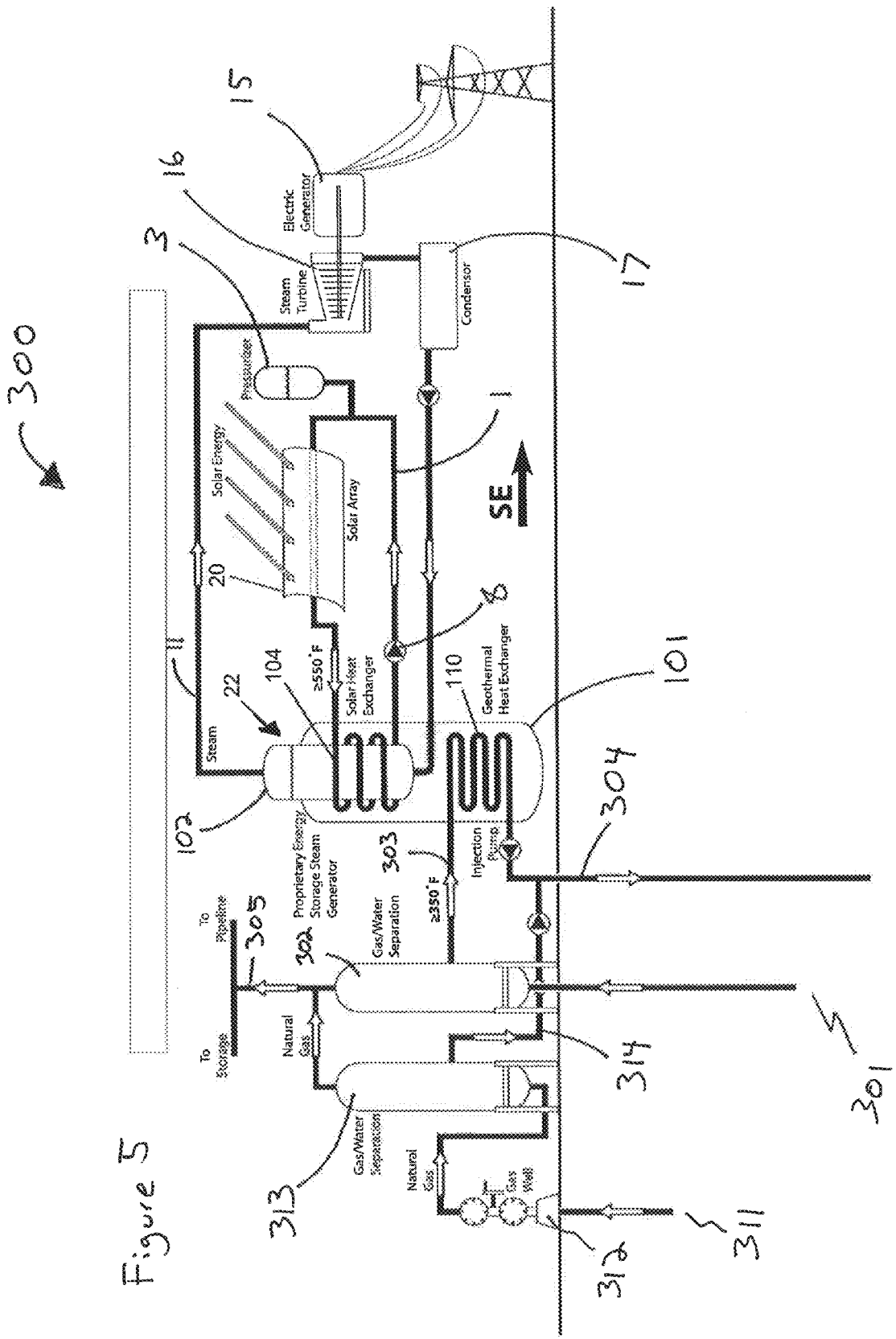
FIG. 5 is a schematic view of a third embodiment of a pressurized solar power system in accordance with the present invention.

Turning to FIG. 5, a third embodiment of a pressurized solar power system 300 is shown. The embodiment shown in FIG. 5 is similar to the embodiment shown in FIG. 3, with like reference numerals indicating like parts between the two embodiments. The pressurized solar power system 300 comprises solar collector array 20, a pressurized closed solar loop 1, a heat exchanger 22, a steam turbine 16, and an electric generator 15. The heat exchanger 22 comprises a heat exchanger coil 104, a steam generator 102, and a storage media vessel 101. The heat exchanger 22 functions in a manner similar to the heat exchanger 22 of FIG. 3.

The pressurized solar power system 300 in FIG. 5 is shown operating in conjunction with a geothermal power source 301 and a natural gas source 311. Not water, steam, natural gas, and/or other carriers from the geothermal power source 301 are directed to a separation tank 302 where natural gas can be separated from the hot water generated by the geothermal power source 301. The natural gas can be directed through pipe 305 to a natural gas pipeline or natural gas storage tank for suitable use, including as a fuel for a conventional gas turbine for use in combined cycle power operations.

After separating the natural gas from the hot water inside separation tank 302, the hot water can be directed through pipe 303 to the heat exchanger coil 110 in the heat exchanger 22. There, the hot water can supplement the thermal energy produced by the pressurized solar power system 300. After the hot water from the geothermal source 301 has released much of its heat energy in heat exchanger 22, the water can be injected into the ground through pipe 304.

Advantageously, this injection of water into the ground can be used to bring natural gas to the surface from natural gas source 311. A natural gas well 312 can collect the natural gas and transport the natural gas to a separation tank 313. Any water mixed with the natural gas can be removed through pipe 314 and injected into the ground through pipe 304. The recovered natural gas can be collected through pipe 305 and used in any suitable manner, including for combined cycle power operations.

Figure 6:
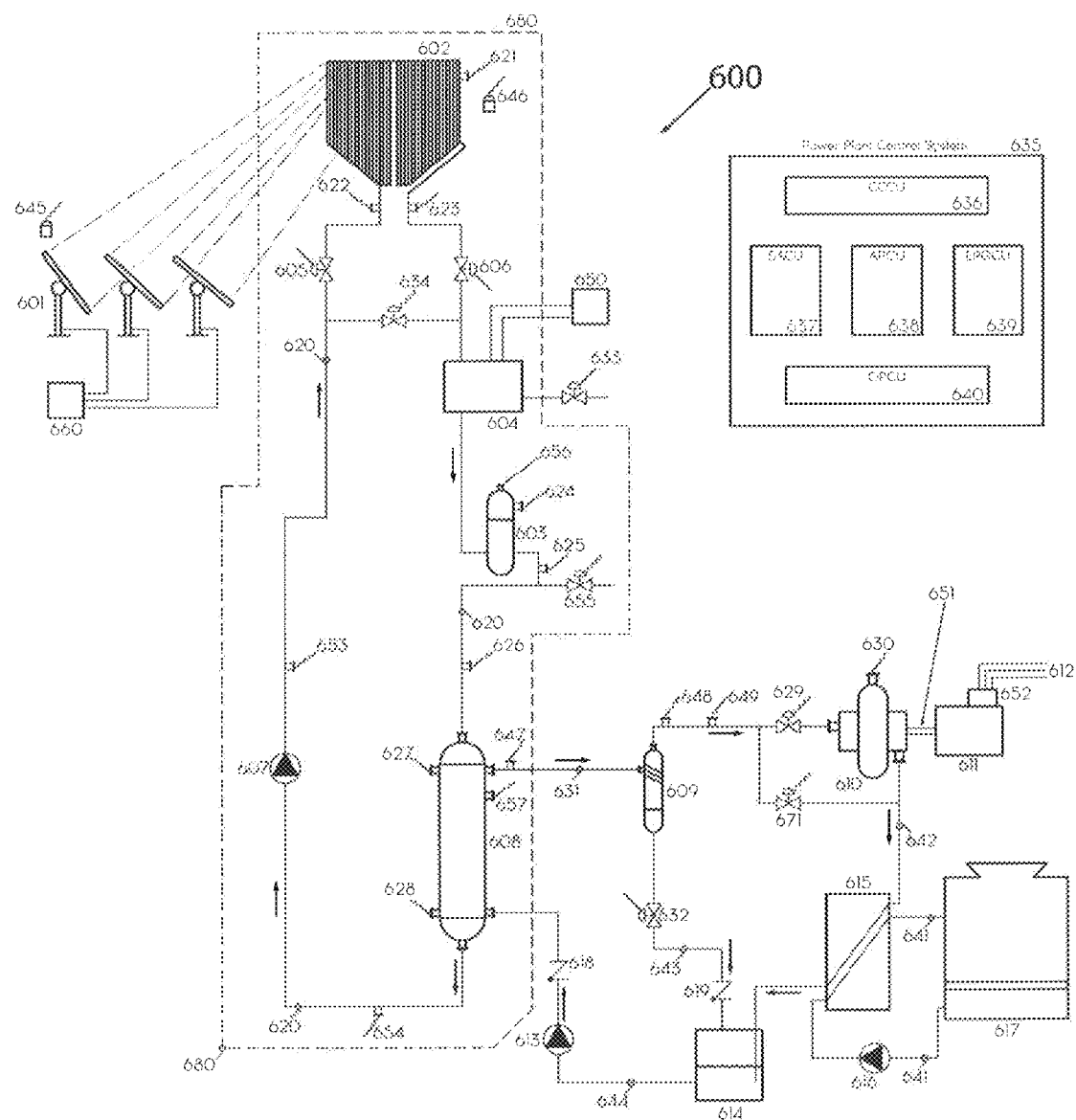
FIG. 6 is a schematic view of a fourth embodiment of a pressurized solar power system in accordance with the present invention.

Turning to FIG. 6, a fourth embodiment of a pressurized solar power system 600 in accordance with the present invention is illustrated. The pressurized solar power system 600 generally comprises a pressurized solar loop 680, a moisture separator 609, a steam engine 610, an electric generator 611, and a power plant control system 635 for controlling the operation of the solar loop 680 and the steam engine 610.

The pressurized solar loop 680, formed by interconnecting piping 620 and components specified below, contains water under pressure. The pressurized solar loop 680 is a closed circuit of pressure resistant piping 620 in a network that connects the system components specified below. The components include a solar receiver 602, a pressurizer 603, a water to water steam generator 608, an auxiliary heat injection unit 604 connected in series to the pressurized solar loop 680, temperature sensors such as 621, 622, 623, 625, 626, 627, and 628, pressure sensors such as 624 and 647, a flow rate sensor 653, a bleed valve 655, a master pressurized solar loop pressure safety relief valve 656, a steam delivery relief valve 657, and operational control devices such as valves 671, 605, 606, and 634 operated by a power plant control system 635. Also, one or more variable speed pumps, such as pump 607, are connected in series in the pressurized solar loop 680. The pump 607 circulates water through the solar receiver 602, pressurizer 603 and the water to water steam generator 608. The speed of the pump 607, and therefore the flow rate of water flowing through the pressurized solar loop 680, is controlled by the power plant control system 635. A master steam side pressure relief valve 657 is located on the steam generator 608 and provides steam side over pressure protection. The master steam side pressure relief valve 657 vents to the atmosphere.

A solar collector array 601 concentrates solar energy by reflection of incident sunlight onto a solar receiver 602. The solar collector array 601 can be any one of a number of concentrating methods including, but not limited to, linear Fresnel reflectors, dual axis heliostat reflectors, parabolic trough concentrator reflectors, conical reflectors, spherical reflectors, Fresnel lens concentrators, and compound parabolic concentrators. An array control 660 is a remote, programmable concentrator control. The array control 660 operates individual mechanisms on the solar collector array 601 that focus solar energy on the solar receiver 602. The array control 660 has an internal program that is aware of location, time, date, and percentage of energy required. An ON signal and percentage of solar energy signal are sent to the array control 660 from the power plant control system 635.

The solar receiver 602 of the present invention can be any one of a number of differing configurations as may be required to work in conjunction with type of solar concentration methods employed. The configuration of the solar receiver 602 will necessarily change based on the type of solar collector array 601 employed to deliver sunlight to the solar receiver 602. The solar receiver 602 that may be employed in the present invention includes, but is not limited to, single line linear piping in atmosphere, single line linear piping in vacuum, single line linear piping in a gas shielded transparent enclosure, single line linear piping in a convection suppressing enclosure, multiple line linear piping in atmosphere, multiline linear piping in a convection suppressing enclosure, a parallel pipe flat panel receiver configuration, a cylindrical configuration of parallel, series or series parallel piping, a cavity type receiver wherein sunlight enters an opening in cylindrical configuration receiver so as to irradiate the interior of the cylindrical receiver, or a cavity receiver, such as cavity receiver 801 (FIGS. 8 and 9) that is described in greater detail below. An irradiance sensor 645 senses the irradiance of sunlight available at the solar collector array 601, and an ambient temperature sensor 646 senses the ambient temperature adjacent the solar receiver 602.

A pressurizer 603 is connected in series in the pressurized solar loop 680. The pressurizer 603 pressurizes the water in the pressurized solar loop 680 to a predetermined level in order to raise the boiling point of the liquid water in the pressurized solar loop 680 to a temperature above the required design temperature of the closed pressurized solar loop 680. The design temperature is a function of the heat energy required to produce steam of the quality, flow rate, and temperature required of the steam produced in the steam generator 608.

The pressurizer 603 may optionally have an external or internal heater (not shown) to create an initial steam bubble within the pressurizer 603. The heater may be either a fuel burning heater or an electric resistance heater. The pressurizer 603 may also have a compressed air injection port (not shown) in the upper portion of the internal cavity of the pressurizer 603. During the plant startup mode the injected air creates room for a steam bubble to form from the heated liquid water being circulated through the pressurizer 603 by the circulation pump 607. The procedure used in forming the steam bubble inside the pressurizer 603 using compressed air may include bleeding water from the solar loop 680 via the bleed valve 655.

Yet another method of steam bubble formation in the pressurizer 603 is to introduce heat to the complete set of components of the pressurized solar loop 680 by means of the auxiliary heat injection unit 604. In this method, the circulation pump 607 will circulate water through the auxiliary heat injection unit 604 where the water circulating in the pressurized solar loop 680 is heated. As the temperature rises in the in the pressurizer 603 as a result of the water being heated by the auxiliary heat injection unit 604, water can be bled from the pressurized solar loop 680 via the bleed valve 655, thereby allowing a steam bubble to form in the upper section of the pressurizer 603. Additional water required to make up a full volume of water in the pressurized solar loop 680 can likewise be introduced through the bleed valve 655.

The master pressurized solar loop pressure safety relief valve 656 is mounted adjacent the top of the pressurizer 603. The master safety relief valve 656 is designed and set to a pressure that will open the master relief valve 656 in the event of over pressure thereby protecting all of the components of the pressurized solar 680 from damage.

The required operating pressure for the pressurized solar loop 680 will remain constant as a function of heat energy input from the solar array 601 focusing sunlight on the solar receiver 602 and auxiliary heat energy contributed by the auxiliary heat injection unit 604 as may be needed to supplement the energy acquired from solar irradiance. The steam bubble inside the pressurizer 603 is a self-adjusting mechanism because the heat energy of the water in closed solar loop 680 will maintain the required pressure in the pressurizer 603 and thus on the liquid water in the pressurized solar loop 680. Advantageously, this pressure inside the solar loop 680 increases the boiling point of the water in the pressurized solar loop 680 as required, thus preventing the water from flashing over to steam as temperature changes may occur. As solar energy increases, the temperature of the water circulating in solar loop 680 via piping 620 increases, and the pressure in the steam bubble in the pressurizer 603 increases, thereby creating a self-regulating pressure control system.

The auxiliary heat injection unit 604 is attached to the solar loop 680 in a parallel configuration, preferably near the point where the pressurized solar loop 680 enters the water to water steam generator 608. The auxiliary heat injection unit 604 supplements the heat required in the pressurized solar loop 680 to keep the closed solar loop 680 at a steady pressure and temperature. Due to the variable nature of sunlight, the primary energy source for the pressurized solar loop 680, the parallel connection of the auxiliary heat injection unit 604 allows for partial in-feed of heated water into the pressurized solar loop 680 thereby providing a means to add discrete amounts of heat energy to supplement the solar heat energy as may be required to keep the system in safe and level operation. In-feed and out-feed of water in solar loop 680 to and from the auxiliary heat injection unit 604 is controlled via a set of three flow control valves 605, 606, and 634 in combination with the pump 607. These flow control valves 605, 606, and 634 and the pump 607 receive operational signals from power plant control system 635 to control the flow of water in the solar loop 680 and the auxiliary heat injection unit 604. A fuel valve 633 controls the flow of fuel to the auxiliary heat injection unit 604 to thereby control the temperature of the water flowing through the auxiliary heat injection unit 604.

The use of a single-phase (water only) pressurized solar loop 680 prevents Ledinegg I output stability and unwanted pressure variations. Water also has an increased energy carrying capacity in comparison to steam. Thus, the pressurized water in the pressurized solar loop 680 can carry more energy than a comparable CSG system with a two-phase (water/steam) energy transport mechanism.

As previously described, the pressurized solar loop 680 includes the steam generator 608. The heat energy in the water in the pressurized solar loop 680 is used to create steam in the steam generator 608 as previously described in connection with the pressurized solar power systems 100, 200, and 300. The steam generator 608 is partially filled with water to provide space for steam accumulation. An output steam delivery pipe 631, connected to the upper portion of the steam generator 608, delivers steam flow to and through a moisture separator 609. The moisture separator 609 allows any liquid in the steam to drop out due to baffling and gravity. The resulting dry steam, which is essential to the safe and efficient operation of the steam engine 610, then exits moisture separator 609 through a pipe connected to a throttle valve 629. The throttle valve 629 connects the dry steam to the steam engine 610 and provides a mechanism for controlling the speed of the steam engine 610. A bypass valve 671, controlled by the power plant control system 635, routes the steam around the steam engine 610 during startup of the pressurized solar power system 600. During startup, the throttle valve 629 is closed so pressure in the system can build as steam pressure and temp increase. During startup, the bypassed valve 671 is gradually closed to build pressure up to operating level. At the end of the startup sequence, and when the pressurized solar power system 600 is in run mode, the throttle valve 629 will be open and controlled by the power plant control system 635 to regulate the steam engine speed using the steam engine speed sensor 630.

The steam engine 610 is connected to an electric generator 611. Particularly, the steam engine 610 and the electric generator 611 are mechanically connected by shaft linkage 651. The shaft linkage 651 may have a clutch mechanism to disengage the steam engine 610 and the electric generator 611 in case of an emergency. The electric generator 611 has a braking system to slow and stop the rotation of the electric generator 611.

The throttle valve 629 controls steam flow, via signals from the power plant control system 635, to the steam engine 610 to control the steam engine speed. By controlling the speed of the steam engine 610, the speed of the electric generator 611 speed is likewise controlled, and that assures level, phase matched AC current output to an electric load 612, such as a power grid.

A liquid level control valve 632 is connected to the bottom of the moisture separator 609 via a liquid line pipe 643. The liquid line pipe 643 connects the moisture separator 609 to a condensed water accumulation device 614 through a check valve 619. The liquid level control valve 632 is operated by the power plant control system 635 and is actuated from time to time as required to keep the moisture separator 609 operating properly, which means little or no water in the moisture separator 609. A liquid level detector (not shown) in the moisture separator 609 provides data to the power plant control system 635 for controlling the liquid level control valve 632.

A steam engine exit pipe 642 delivers exhaust steam from the steam engine 610 to a steam condenser 615. The steam condenser 615 is a dual pass heat exchanger. The exhaust steam from the steam engine 610 enters the steam condenser 615 on one end of one side of the steam condenser 615 and exits as water through a connection at the other end of the one side of the steam condenser 615. The steam condenser device 615 has a second side that is in physical contact in order to conduct heat energy from the one side to the second side but does not allow the fluids on the sides to mix with or contact one another. The second side has an entry connection and an exist connection. Cooling water from a cooling device 617, such as a cooling tower, flows via piping 641 to and from the second side connections of the steam condenser 615 and is circulated by a pump 616. Water in the cooling device 617 is exposed at atmospheric pressure to air moving in the cooling device thereby reducing the temperature of the cooling water before the cooling water is returned to the steam condenser 615.

Water exiting the steam condenser 615 travels via piping to the condensed water collection device 614. Pressure inside the condensed water collection device 614 is above atmospheric pressure but not at the steam engine 610 operating pressure. A condensate return pipe 644 connected to the condensed water accumulation device 614 delivers condensate water to the steam generator 608 via a check valve 618 by means of a pump 613. This connection completes a closed circuit steam system that keeps the steam engine 610 operating continuously when input energy is present.

Important to successful, safe, and efficient operation of the pressurized solar power system 600 of FIG. 6 is the power plant control system 635. Because the solar energy resource is not constant, the power plant control system 635 operates to accommodate the variations in the amount of solar energy available to the pressurized solar power system 600. The power plant control system 635 measures the variable parameters of the pressurized solar power system 600 and manages the pressurized solar power system 600 accordingly. Daily variations of sunlight available for concentration created by the diurnal shift of the suns position which changes every day of the year, the daily ambient temperature changes of location where the pressurized solar power system 600 is located, weather patterns that create varying cloud conditions, atmospheric clarity due to wind driven particulates, surface winds that create movement of solar reflectors used in concentration, all contribute to the creation of highly variable input energy source from the solar collector array 601. Further, there are requirements for management of a variable load of a power generation system that is connected to a public or private utility grid. Therefore, key to the successful operation of the pressurized solar power system 600 illustrated in FIG. 6 is a power plant control system 635. Conventional fueled or nuclear power plants all have a constant energy input cycle and therefore do not require the level of input energy measurement and fuel resource management of that required to successfully operate the pressurized solar power system 600 of FIG. 6.

Figure 7:
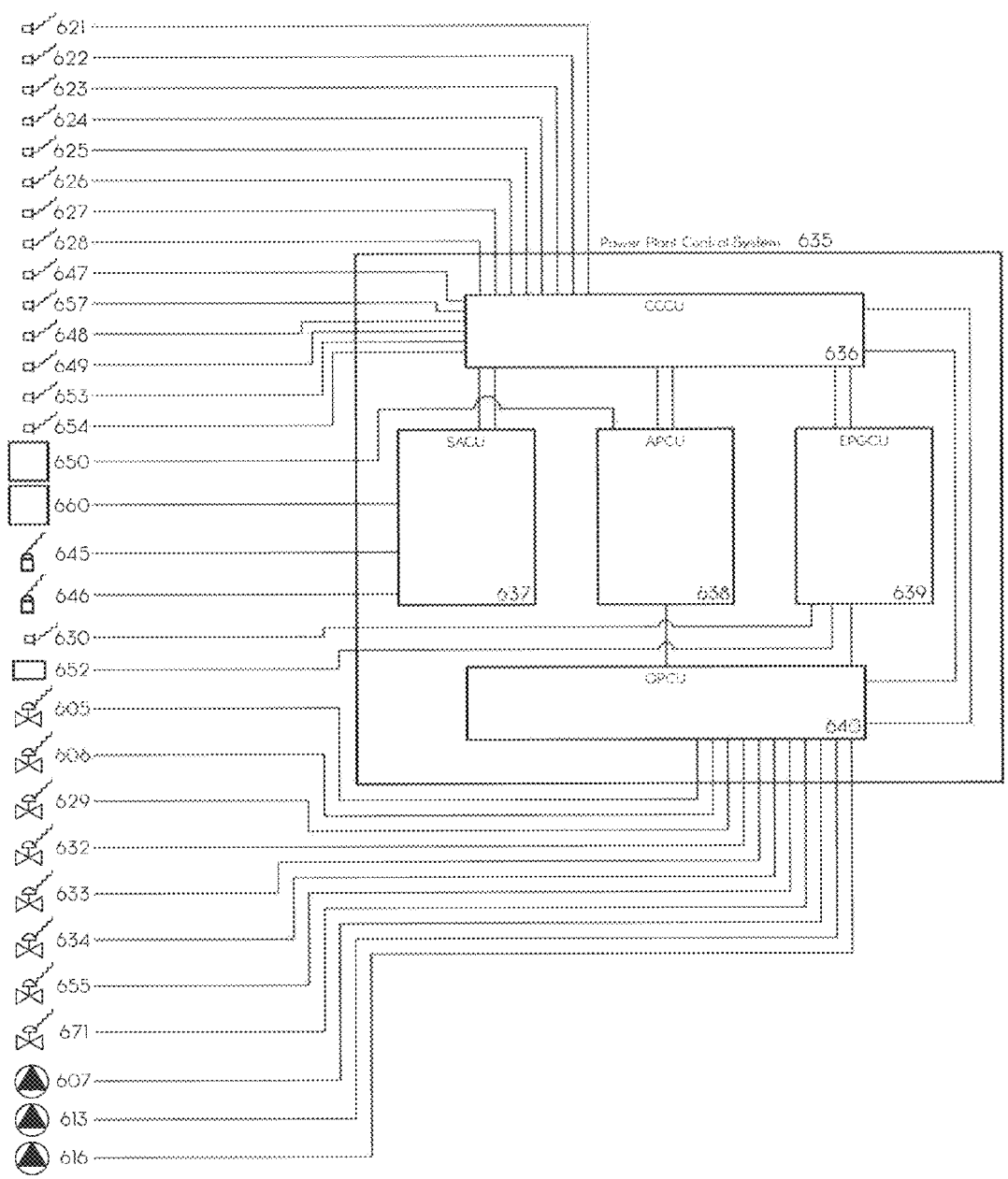
FIG. 7 is a block diagram of a power plant control system for controlling the operation of the fourth embodiment of the pressurized solar power system in accordance with the present invention.

With reference to FIGS. 6 and 7, the power plant control system 635 is implemented by a general purpose computer operating software designed to control the operating parameters of the pressurized solar power system 600. The power plant control system 635 receives input from various sensory inputs, such as temperature sensors 621-623, 625-628, 654, and 646, from pressure sensors 624, 647, and 648, from flow sensors 649 and 653, and from the speed sensor 630, all of which measure the ambient and dynamic system component characteristics and operational parameters of the pressurized solar power system 600 of FIG. 6. From the operational parameters, the power plant control system 635 controls operating components such as the flow valves 605, 606, 629, 632, 633, 634, 671 and 655 and controls the pumps 607, 613, and 616.

With continuing reference to FIGS. 6 and 7, the power plant control system 635 is made of five separate control modules comprising, a central computer control unit (CCCU) 636, a solar array control unit (SACU) 637, an auxiliary power control unit (APCU) 638, an electric power generation control unit (EPGCU) 639, and an output power control unit (OPCU) 640, all of which interface with each other to accomplish the task of operating the pressurized solar power system 600 so that the pressurized solar power system 600 can deliver a constant level of phase matched electric power from a variable heat input resource to a public utility grid or to a power consumption scheme that must work in conjunction with a parallel phase matched to a public utility grid.

The CCCU 636 is the main sensory data input receiver and logic center of the power plant control system 635. The CCCU 636 receives sensory data and sub-component communication inputs and uses those data and inputs to control various processes through analog and digital controlled electro-mechanical means in order to keep the complete pressurized solar power system 600 operating at a constant and safe level of electric output to an electric load. Insofar as the solar resource is variable as a function of the geographic location in which the pressurized solar power system 600 is installed, the CCCU 636 operates the pressurized solar power system 600 using a computer program designed specifically to run the pressurized solar power system 600 in the geographic location where the pressurized solar power system 600 is located.

A set of system operating control devices (the flow valves 605, 606, 629, 632, 633, 634, 671, and 655 and the pumps 607, 613, and 616) are connected to and directly actuated by the OPCU 640, which in turn is controlled by the CCCU 636. The OPCU 640 is used in the mechanical operation of the various operating control devices of the pressurized solar power system 600. The OPCU 640 receives control signals from the CCCU 636 via other sub components of the power plant control system 635 and in turn, the OPCU 640 actuates the relays and/or switches and operating control devices to turn on or off and vary control voltage and current levels to the various operating control devices of the pressurized solar power system 600 such as the flow valves 605, 606, 629, 633, 634, 671, and 655 and the pumps 607, 613, and 616. As an example, the operating control devices in the pressurized solar power system 600 are, but not limited to, pumps, both constant and variable speed, valves, actuators for hydraulic components, solar arrays and recording devices and safety equipment.

The SACU 637 is an interface between the CCCU 636 and the OPCU 640. The CCCU 636 and a separate internal program in the SACU 637 manage the SACU 637. Together the programs of the CCCU 636 and SACU 637 optimize solar energy delivery to the solar receiver 602 as required to keep the pressurized solar power system 600 operating at a safe and level output of electric power. The programs of the CCCU 636 and SACU 637 are tailored to the specific geographic location of the pressurized solar power system 600.

The APCU 638 receives control signals from the CCCU 636 that direct the APCU 638 to introduce additional heat energy as may be needed to keep the pressurized solar loop 680 at a constant temperature and therefore pressure in order to provide a level and safe output of electric power delivery from the pressurized solar power system 600 to the load 612. The APCU 638 is a sub-component of the power plant control system 635 and is an interface between the CCCU 636 and the MPCU 640. The APCU 638 receives master signals from the CCCU 636 to add heat energy to the pressurized solar loop 680 as may be required to form a steam bubble in the pressurizer 603 or to keep a level energy delivery during times of change in the solar energy resource due to a variety of factors. The APCU 638 further receives data from the auxiliary heat injection unit 604, via an auxiliary heat control and sensor device 650 to insure all operational parameters of the auxiliary heat injection unit 604 are being met. Auxiliary fuel quantity, time on duration, pressurized water exit temperature, exhaust gas temperature, are some but not all of the parameters that may be measured by the auxiliary heat sensor and control device 650. The interactive communication of the APCU 638 and the CCCU 636 provide operational data to the CCCU 636. The operational data is required by and used by the CCCU 636 to insure safe and level output electric power from the pressurized solar power system 600. The safe and constant delivery of heat energy by the auxiliary heat injection unit 604 is important to the operation of the pressurized solar power system 600. This is accomplished by the APCU 638 controlling the operation of the auxiliary heat sensor and operating control devices as well as providing operating signals via OPCU 640 to the operating control devices of the pressurized solar power system 600 in order to introduce auxiliary heat energy to the pressurized solar loop 680. The operating control devices include but are not limited to, fuel pumps, burner ignition devices, pressurized water flow control valves, cooling fans, bypass valves and other components and elements required to safely inject heat energy to the pressurized solar loop 680 in order to maintain a level delivery of electric power from the pressurized solar power system 600.

The EPGCU 639 provides information to, and receives command communications from, the CCCU 636 in addition to direct sensory input from the engine speed sensor 630 and from an electrical load measurement and phase detection monitor 652. The monitor 652 detects the power grid phase and voltage amplitude and feeds that information to the power plant control system 635. On command from the power plant control system 635, the monitor 652 closes a connection to the grid connection when the power plant control system 635 determines safe conditions are present to do so. Further, the CCCU 636 determines the proper operating conditions required to connect the electric power generator 611 to a public, or private, utility grid. The EPGCU 639 is also in communication with the OPCU 640. The OPCU 640 provides power to an actuator unit on or in the electric power generator 611, which engages or disengages the output AC power of the power generator 611 to the load 612, whether the load 612 is a public or private utility grid or other such load. The EPGCU 639 insures that a phase and voltage amplitude matched current is available from the electric generator 611 to connect to the designated load 612. The speed of the steam engine 610 and therefore the speed of the electric generator 611 are sensed by the speed sensor 630 and communicated to the EPGCU 639. The speed data are communicated from the EPGCU 639 to the CCCU 636. The pressure sensor 647 in the output steam pipe 631 provides data input to the CCCU 636 via direct or wireless interconnections. The CCCU 636 uses the information in the internal decision making processes of the CCCU 636 for controlling the operation of the steam engine 610.

Figure 10:
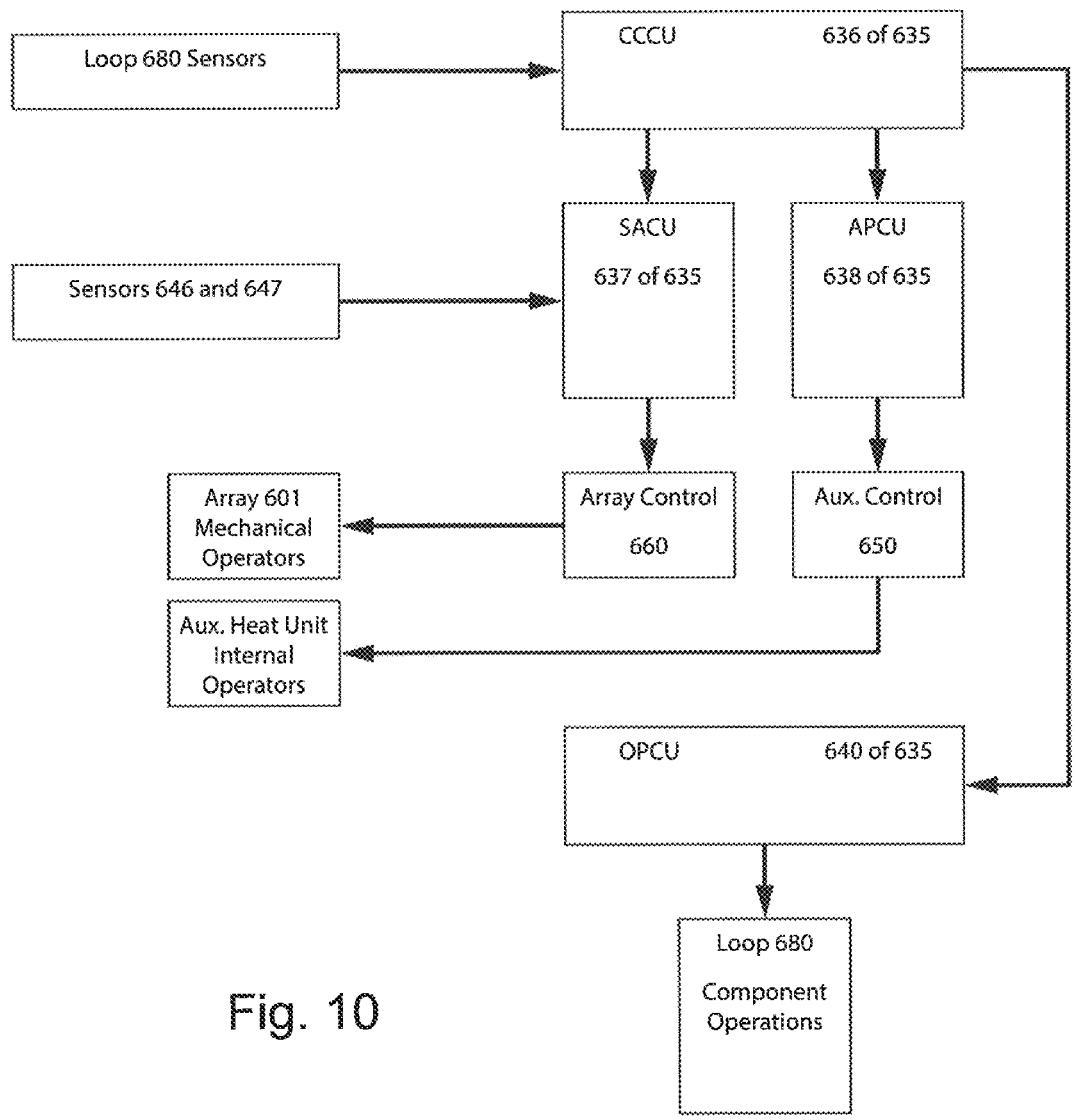
FIG. 10 is a block diagram showing the interconnections of the control units of the power plant control system of the pressurized solar power system in accordance with the present invention.
Figure 11:
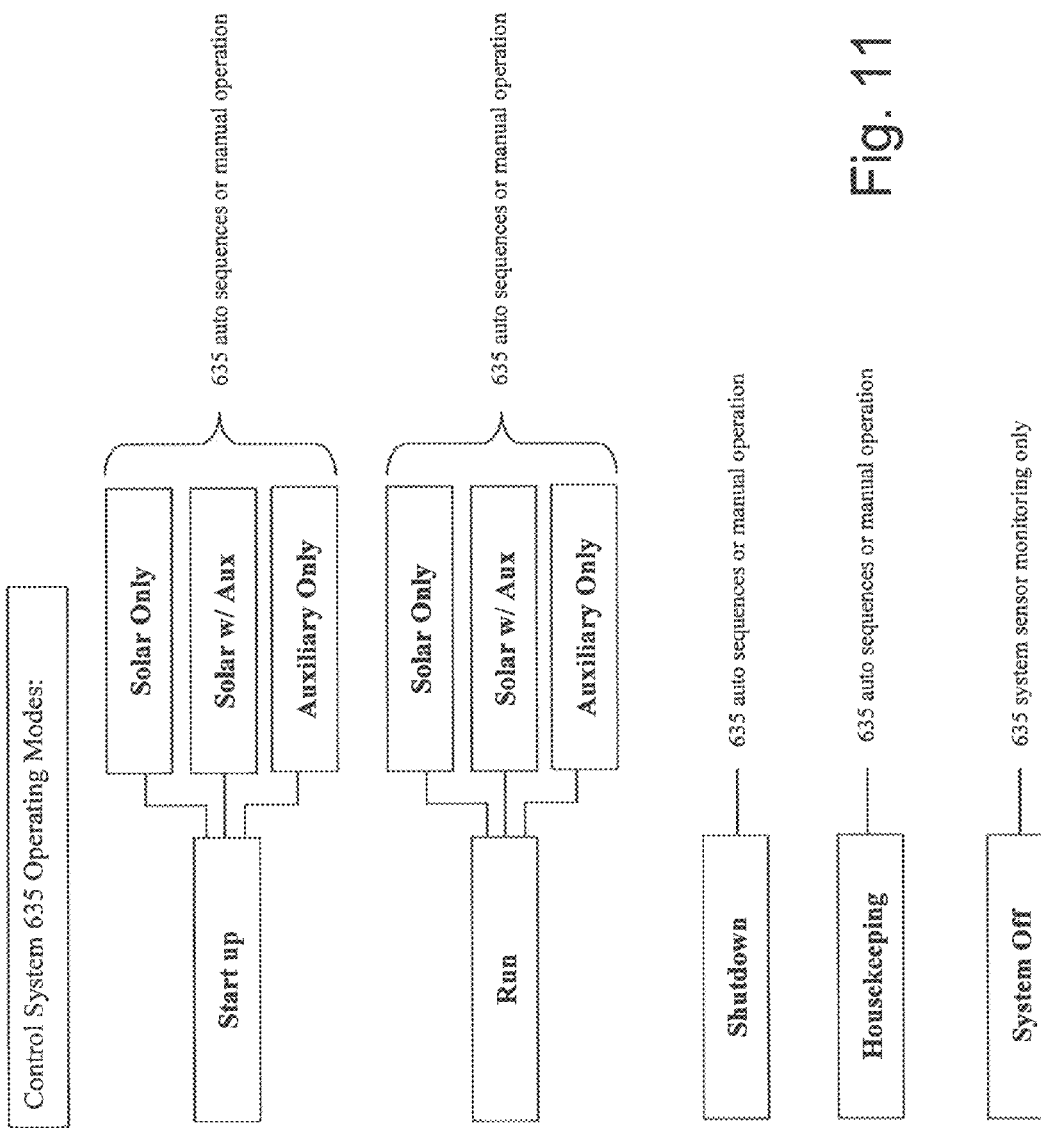
FIG. 11 is a flowchart showing the five operating modes of the pressurized solar power system in accordance with the present invention.

With reference to FIGS. 10 and 11, the power plant control system 635 measures a set of data inputs and adjust the addition of heat energy as may be required to keep the pressurized solar power system 600 operating at a level output of electric energy.

As shown in FIG. 11, the power plant control system 636 has five operational modes that control the pressurized solar power plant 600.
 1. System Startup mode
  a. Solar heat energy only
  b. Solar heat energy with auxiliary heat energy
  c. Auxiliary heat energy only
 2. System Run mode
  a. Solar heat energy only
  b. Solar heat energy with auxiliary heat energy
  c. Auxiliary heat energy only
 3. System shut down mode
 4. Housekeeping mode
 5. System Off In the system startup mode, the power plant control system 635 is pre-programmed to start plant 600 automatically. In the system startup mode, auxiliary heat energy is supplied to the pressurized solar loop 680 from the auxiliary heat injection unit 604 or from the solar receiver 602 or both simultaneously. At startup, the power plant control system 635 selects solar heat energy only, solar heat energy with auxiliary heat energy, or auxiliary heat energy only depending the conditions of the pressurized solar power system 600 that are continuously monitored by the various system sensors and supplied to the power plant control system 635.

Because a set pressure is required in the closed solar loop 680 prior to operation of pressurized solar power system 600 and because the operation of the pressurized solar power system 600 is dependent on a steam bubble being present in pressurizer 603, sufficient heat energy most be added to solar loop 680 to form a steam bubble in the pressurizer 603 by solar heat energy only, by solar heat energy with auxiliary heat energy, or by auxiliary heat energy only. The power plant control system 635 selects the solar heat energy only mode, the solar heat energy with auxiliary heat energy mode, or the auxiliary heat energy only mode by configuring the valve settings of valves 605, 606 and 635.

In the auxiliary only startup mode of the closed solar loop 680, the valves 605 and 606 are closed, and the bypass valve 634 is open. The pump 607 is activated at full speed and the auxiliary heat injection unit 604 is switched on at full power by opening the fuel control valve 633. The auxiliary heat injection unit 604 is directly controlled by a signal from the APCU 638 to the auxiliary heat sensor and control device 650. In the startup mode, the pumps 613 and 616 are off, the throttle valve 629 to the steam engine 610 is closed, the bypass valve 671 is open, and the valve 632 to the moisture separator 609 is closed. In this operational line up of the valves 605 (closed), 606 (closed), 671 (open), and 634 (open), heat energy is supplied to the closed solar loop 680 exclusively by the auxiliary heat injection unit 604. Heat energy input into the closed solar loop 680 from the auxiliary heat injection unit 604 and circulation of the water by the pump 607 in the closed solar loop 680 continue until exit temperature sensor 625 and pressure sensor 624 of the pressurizer 603 are in range of preset values for the pressurizer 603. The bleed valve 655 is intermittently opened to release pressurized water as the steam bubble forms in the pressurizer 603. Auxiliary heat energy input from the auxiliary heat injection unit 604 is controlled during startup to maintain design temperature and pressure in the solar loop 680.

Once a steam bubble forms in the pressurizer 603 and the temperature in the solar loop 680 is in operating range as indicated by sensors 624, 625, 626, 627, 628, 654, 653 and 657, the pressurized solar power system 600 is ready to begin electricity generation on auxiliary power or wait until sufficient solar irradiance is present at the solar collector array 601 to introduce heat energy into the solar loop 680.

When solar irradiance reaches a preset value as determined by the instantaneous solar irradiance sensor 645 and the internal programming of the SACU 637, an array controller 660 and the SACU 637 communicate between themselves, and a signal is sent to the CCCU 636 that solar energy is available and that the pressurized solar power system 600 is ready to bring solar energy on line. Under the control of the CCCU 636, the valve 606 is slowly opened to 10% to insure pressurization of the solar receiver 602. At the same time preset programming of the SACU 637 and the array controller 660 gradually bring concentrated solar energy to bear on the solar receiver 602 by focusing some of the concentrating devices of the solar collector array 601 on the solar receiver 602. The temperature sensor 621 is constantly communicating the temperature of the solar receiver 602 to the CCCU 636.

As the solar receiver 602 approaches the design operating temperature of the solar loop 680, the CCCU 636 signals the OPCU 640 to open the valve 605 by 10% and close the bypass valve 634 by 10%. At a preset temperature for the solar receiver 602, the CCCU 636 communicates with the SACU 637 to insure solar irradiance is steady and the receiver proximity temperature sensor 646 is reading in range. If the sensors 645 and 646 indicate a steady reading in the operating range, then a signal is sent to the SACU 637 to bring more solar energy to bear on the solar receiver 602. Automatic internal programming of the SACU 637 and the array controller 660 bring solar energy to bear on the solar receivers 602 in a controlled manner. Simultaneously, the CCCU 636 gradually closes the bypass valve 634 while opening the valves 605 and 606. Once full solar irradiance is achieved, the pressurized solar power system 600 is ready to operate on solar energy with automatic auxiliary energy input as needed.

While the startup sequence and the solar irradiance operations are being performed, the CCCU 636 and the EPGCU 639 determine the status of the components of the pressurized solar power system 600. Working together the CCCU 636 and the EPGCU 639 begin aligning system components to begin working steam generation followed by electricity generation.

The CCCU 636 and the EPGCU 639 working through the OPCU 640 perform all of the following operations. The CCCU 636 constantly monitors the sensory data input from all steam side sensors, including sensors 627, 647, 648, and 649. During startup, the valves 629, 632, and 671 are in the closed position. As temperature and pressure build in the solar loop 680, steam is produced in the steam generator 608. Pressure builds against the valves 618, 629 (which is closed), 632, and 671. When steam in the line 631 reaches the preset value of temperature and pressure, the bypass valve 671 partially opens to allow steam to flow to the steam condenser 615. As the bypass valve 671 opens, the pump 616 starts and circulates water via the cooling device pipe 641 between the steam condenser 615 and the cooling device 617. The cooling device 617 begins operating to remove heat from the condenser 615. Steam entering the steam condenser 615 via the bypass valve 671 is condensed to water and enters the condensed water accumulation device 614.

As the water level rises in the condensed water accumulation device 614, the pump 613 is energized by the power plant control system 635 to move water from the condensed water accumulation device 614 to the steam generator 608. The pressure boost pump 613 runs based on the water level in the condensed water accumulation device 614

As steam pressure and temperature rise in the output steam pipe 631, the power plant control system 635 continues to open gradually the bypass valve 671 to the full open position. The full open position of the bypass valve 671 creates back pressure in the steam pipe 631 that is equal to the same back pressure experienced when the steam engine 610 is running under full load. When steam in the steam pipe 631 reaches sustained operating temperatures, which are above 350° F., for 5 minutes or more with the bypass valve 671 open and when steam flow and pressure in the steam pipe 631 are in operating range, the power plant control system 635 opens the throttle valve 629 to allow a small volume of steam to begin rotation of the steam engine 610. Over the course of a time specified by the steam engine manufacturer, the throttle valve 629 is opened as the bypass valve 671 is closed. These operations are part of an internal programming sequence of the power plant control system 635. At the end of the startup sequence for the steam engine 610, the stream engine is running at 100% rpm and turning the generator 611 under no load. At this point all components on the steam side of the plant are operating under automatic control from the power plant trolls system 635.

The power plant control system 635 monitors voltage phase and amplitude of the grid to which the generator 611 will be connected via the electric load measurement and phase detection system 652 and compares the voltage phase and amplitude of the grid to the output of the generator 611. The power plant control system 635 continues monitoring voltage phase and amplitude for a preset time to insure the generator 611 can be connected safely to the load 612.

Table 1 below shows each of the components of the solar loop 680 and each component's set/status/control, each component's related sensor, the description for each component, the input to the power plant control system 635, and the operating unit of the power plant control system 635 that controls the operation of each of the components.

TABLE 1

Closed Loop 680 Operation-Automatic with Solar Mode
System Lineup

| Loop 680 Components | Set/Status/Control | Loop Sensors | Description | Input to 635 | Operating Unit |
|---|---|---|---|---|---|
| Control 635 | Auto w/solar | 645 | Solar Irradiance | w/m2 | SACU 637 |
| Array 601 | Focused/660 | 621 | Receiver Temp | TR | CCCU 636 |
| Receiver 602 | On sun from 601 | 622/623 | Inlet/Outlet Rcvr | ΔT | CCCU 636 |
| Aux 604, valve 633 | On Auto/650 & 635 | 646 | T Ambient @ Rcvr | TAR | SACU 637 |
| Valve 605 | Open/auto | 624 | 603/Loop Pressure | PL | CCCU 636 |
| Valve 606 | Open/auto | 625 | Exit Temp 603 | TE603 | CCCU 636 |
| Valve 634 | Closed/auto | 626/654 | Inlet/Outlet 608 | ΔT | CCCU 636 |
| Pressurizer | Operating | 653 | GPM flow/620 | Mass Flow | CCCU 636 |
| Steam Generator 608 | Operating | 623/625 | Inlet/Outlet 604 | ΔT | CCCU 636 |
| Pump 607 | Run/Auto | 647 | Working Steam | PS | CCCU 636 |
| Valve 655 | Closed/auto | | | | |
| Relief Valve 656 | Manually set | | | | |
| Master Steam Relief | Auto/636 | | | | |
| 660 Array Control | Auto Preset/637 | | | | |
| 650 Aux Control | Auto Preset/638 | | | | |

Figure 8:
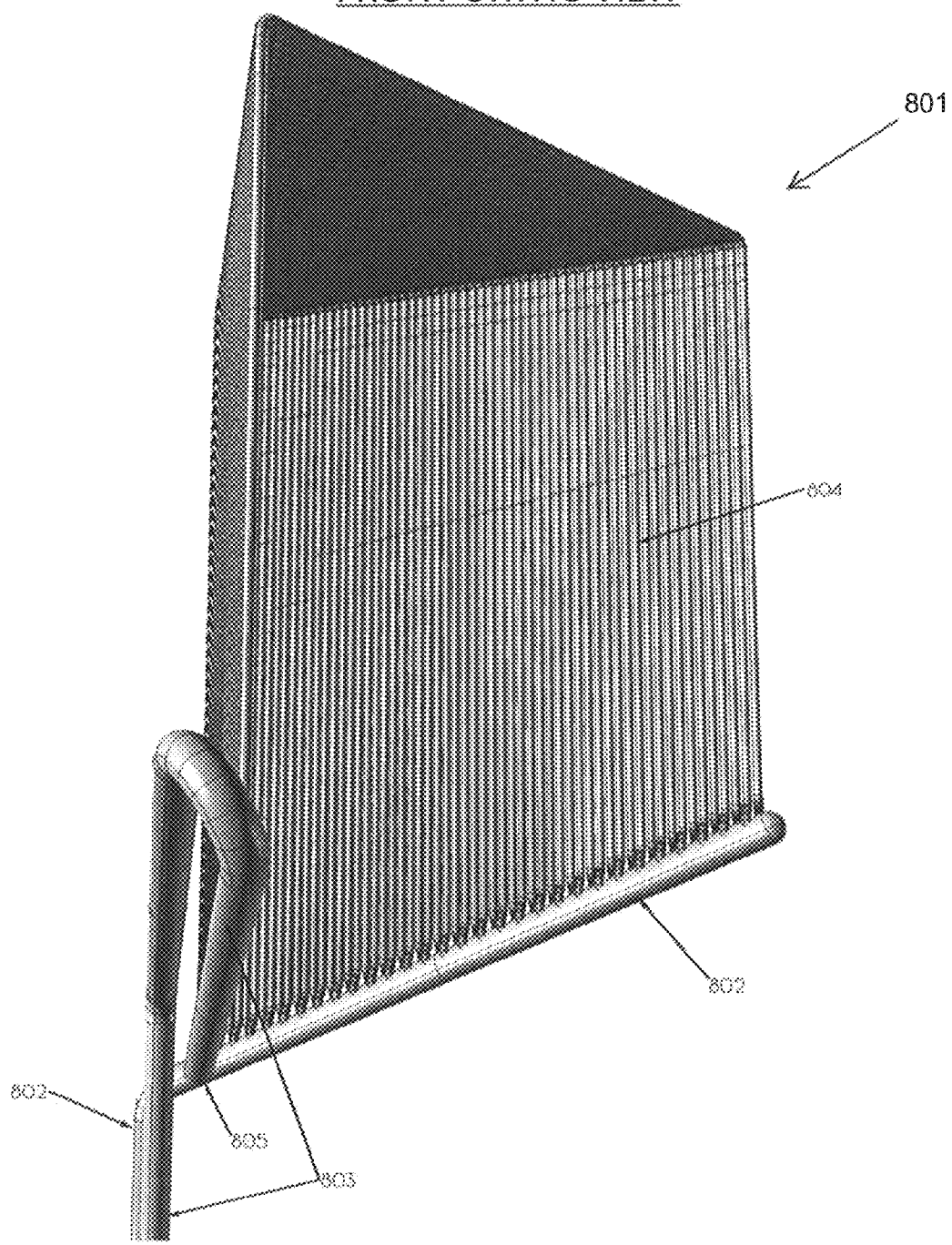
FIG. 8 is a front orthogonal (perspective) view of a solar receiver for use in connection with the pressurized solar power systems in accordance with the present invention.
Figure 9:
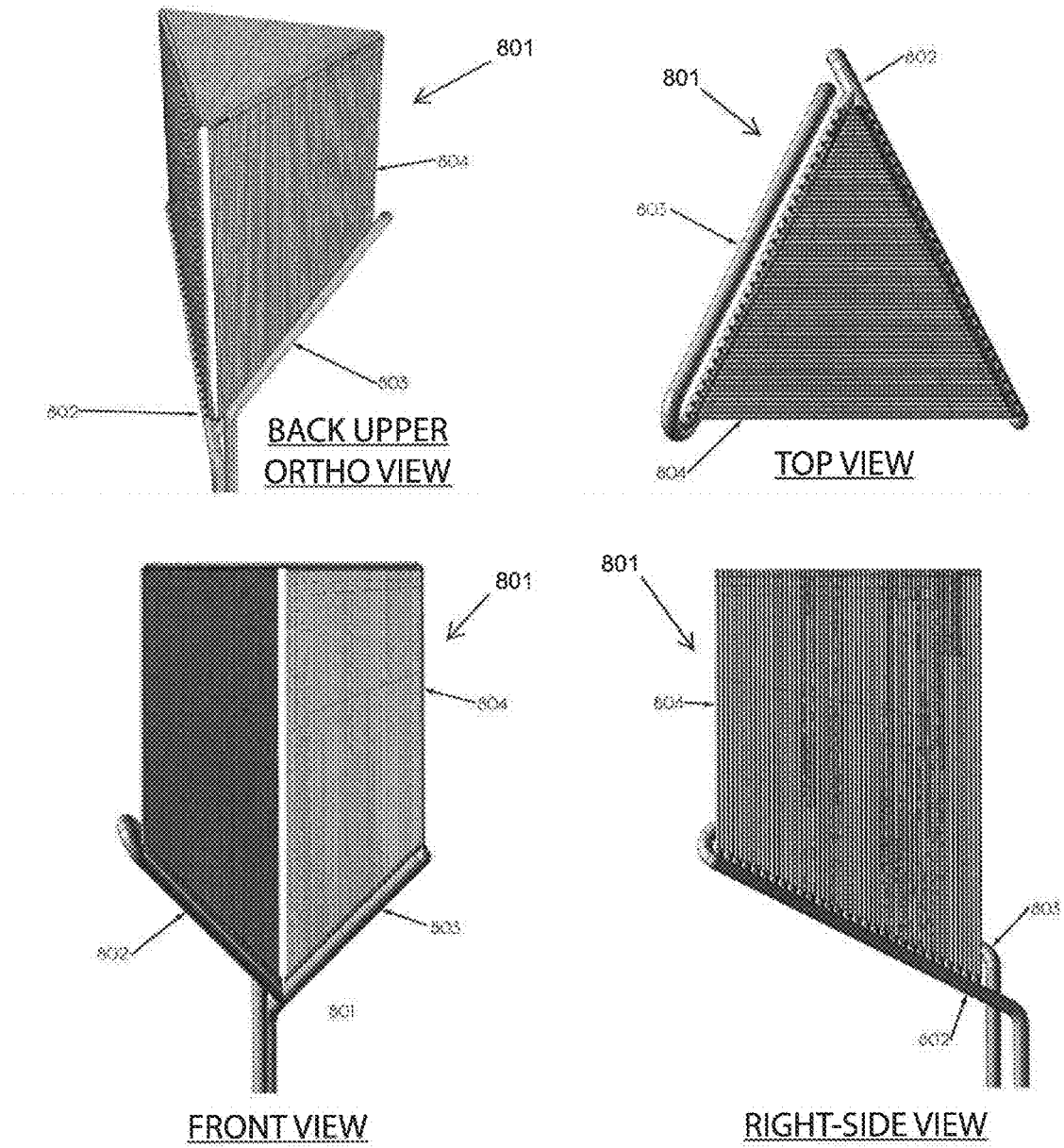
FIG. 9 includes additional views (back orthogonal view, top plan view, front elevation view, and side elevation view) of the solar receiver shown in FIG. 8.

With reference to FIGS. 8 and 9, a solar receiver 801 for use with the pressurized solar power plant system 600 is illustrated. The solar receiver 801 comprises of an assembly of steel or stainless steel piping having a supply line 802 and a return line 803. The return line 803 is configured as a reverse return of the supply line 802. A plurality of intersecting pipes 804 are attached to the supply line 802 and the return line 803. Each of the plurality of intersecting pipes 804 are of equal length.

The supply line 802 and the return line 803 are mechanically connected at junction 805. This connection is made on the exterior of the piping that forms the supply line 802 and the return line 803. There is no flow between the supply line 802 and the return line 803 at the junction 805. Water only flows between the supply line 802 and the return line 803 through the plurality of pipes 804. The junction 805 is used to strengthen the full assembly of the solar receiver 801. Such a configuration provides for an evenly distributed array in the receiver piping which in turn provides the maximum amount of solar receiver surface area exposure with an even flow of pressurized water inside the receiver 801. The configuration of the receiver 801 with maximum surface area exposure and even flow of pressurized water are a highly desirable conditions because those conditions boost dual axis tracking heliostat concentrating solar power system efficiency improvement thereby reducing costs.

Accordingly, while the invention has been described with reference to the structures and processes disclosed, it is not confined to the details set forth, but is intended to cover such modifications or changes as may fall within the scope of the following claims.

What is claimed is:

1. A pressurized solar power system comprising:
   a) at least one solar collector;
   b) a closed loop pipe containing a heat transfer liquid having a boiling temperature at one atmosphere of pressure, wherein said pipe is positioned such that concentrated solar energy from the solar collector is focused on a portion of the closed loop pipe thereby heating the transfer liquid to an operating temperature that is above the boiling temperature of the heat transfer liquid at the one atmosphere of pressure;
   c) a sealed bubble pressurizer attached to said pipe and comprising an internal chamber, where vapor of the heat transfer liquid can form in an upper section of the chamber but cannot be released, thereby self-regulating the vapor pressure of the heat transfer liquid contained in the closed loop pipe to maintain the heat transfer liquid in its liquid state in the closed loop pipe at the operating temperature;
   d) a heat exchanger with a portion of the closed loop pipe located in the heat exchanger and the heat exchanger including a steam outlet pipe;
   e) a ground source of geothermal energy;
   f) ground source of natural gas; and
   g) a gas/water separation tank connected to the source of natural gas for receiving a combination of natural gas and ground water and connected to the source of geothermal energy,
wherein the geothermal energy supplied to the gas/water separation tank assists in the separation of the ground water from the natural gas, wherein the heated ground water in the separation tank is connected to the heat exchanger and supplements the thermal energy from the heat transfer liquid in the closed loop pipe in the heat exchanger, and wherein the heated ground water after circulating through the heat exchanger is injected into the ground to assist in extraction of natural gas from the ground.

2. The pressurized solar power system of claim 1, wherein the pressurized solar power system further includes an auxiliary heater connected to the closed loop pipe for adding thermal energy to the heat transfer liquid in the closed loop pipe to maintain the heat transfer liquid at the operating temperature in the closed loop pipe.

3. The pressurized solar power system of claim 1 wherein said heat transfer liquid is water.

4. The pressurized solar power system of claim 1 wherein said heat exchanger comprises:
    a) a non-pressurized storage media vessel containing a thermal storage medium substance; and
    b) a pressurized steam generator vessel partially filled with water;
wherein thermal energy from the heat transfer liquid in the closed loop pipe and thermal energy from the heated ground water heats the thermal storage medium substance and wherein said thermal storage medium substance heats the steam generator vessel.

\* \* \* \* \*